United States Patent
Eriksson et al.

(10) Patent No.: US 9,806,870 B2
(45) Date of Patent: Oct. 31, 2017

(54) METHODS AND DEVICES FOR PROVIDING FEEDBACK INFORMATION

(75) Inventors: Erik Eriksson, Linköping (SE); Martin Hessler, Linköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 127 days.

(21) Appl. No.: 14/390,623

(22) PCT Filed: Apr. 5, 2012

(86) PCT No.: PCT/SE2012/050379
§ 371 (c)(1),
(2), (4) Date: Oct. 3, 2014

(87) PCT Pub. No.: WO2013/151473
PCT Pub. Date: Oct. 10, 2013

(65) Prior Publication Data
US 2015/0195074 A1 Jul. 9, 2015

(51) Int. Cl.
*H04L 5/00* (2006.01)
*H04L 1/00* (2006.01)
(Continued)

(52) U.S. Cl.
CPC ........ *H04L 5/0057* (2013.01); *H04B 7/0452* (2013.01); *H04L 1/0022* (2013.01);
(Continued)

(58) Field of Classification Search
None
See application file for complete search history.

(56) References Cited

U.S. PATENT DOCUMENTS

2007/0207742 A1   9/2007   Kim et al.
2007/0254595 A1   11/2007  Yoon et al.
(Continued)

FOREIGN PATENT DOCUMENTS

FI   WO 2011083068 A1 *   7/2011   ............ H04L 1/1607
WO   WO 2011083068 A1 *   7/2011   ............ H04L 1/1607

OTHER PUBLICATIONS

PCT International Search Report for International application No. PCT/SE2012/050379, dated Dec. 21, 2012.
(Continued)

*Primary Examiner* — Kouroush Mohebbi
(74) *Attorney, Agent, or Firm* — Patents on Demand P.A.; Brian K. Buchheit

(57) ABSTRACT

The disclosure relates to a method 10 in a wireless device 3 for providing feedback information. The wireless device 3 is adapted for wireless communication in a communication system 1 comprising a network node 2. The method 10 comprises: receiving 11, from the network node 2, a downlink transmission, the downlink transmission comprising a transmission parameter used for the downlink transmission; measuring 12 channel quality of the received downlink transmission; determining 13, based on the measured channel quality, a transmission parameter, that the wireless device 3 is able to support; correlating 14 the transmission parameter used for the downlink transmission with the determined transmission parameter, giving a correlated transmission parameter; and encoding 15 the correlated transmission parameter together with Hybrid Automatic-Repeat-Request feedback information. Methods in a base station node, a base station node, computer programs and computer program products are also presented.

21 Claims, 4 Drawing Sheets

(51) Int. Cl.
*H04L 1/16* (2006.01)
*H04B 7/0452* (2017.01)
*H04L 1/18* (2006.01)
*H04W 24/08* (2009.01)

(52) U.S. Cl.
CPC .......... *H04L 1/0026* (2013.01); *H04L 1/1607* (2013.01); *H04L 1/1887* (2013.01); *H04L 5/0055* (2013.01); *H04W 24/08* (2013.01)

(56) References Cited

U.S. PATENT DOCUMENTS

| | | |
|---|---|---|
| 2010/0173641 A1 | 7/2010 | Kim et al. |
| 2011/0080880 A1 | 4/2011 | Yin et al. |
| 2011/0141901 A1* | 6/2011 | Luo ........................ H04L 1/1822 370/241 |
| 2014/0219326 A1* | 8/2014 | Ko ........................ H04B 7/0417 375/228 |

OTHER PUBLICATIONS

PCT Written Opinion of the International Searching Authority for International application No. PCT/SE2012/050379, dated Dec. 21, 2012.

* cited by examiner

METHODS AND DEVICES FOR PROVIDING FEEDBACK INFORMATION

PRIORITY

This nonprovisional application is a U.S. National Stage Filing under 35 U.S.C. §371 of International Patent Application Serial No. PCT/SE2012/050379, filed Apr. 5, 2012 and entitled "Methods and Devices for Providing Feedback Information."

TECHNICAL FIELD

The technology disclosed herein relates generally to the field of wireless communication systems, and in particular to provision of feedback information within such wireless communication systems.

BACKGROUND

In wireless communication systems there is a constant strive for improvement of transmission technologies in order to utilize the available spectrum in most efficient way. Various standards using different radio access technologies have been introduced, one of which is 3GPP LTE (Long Term Evolution). LTE supports high data rates and low latency both for uplink traffic as well as for downlink traffic.

An advantage of an LTE system is the possibility to tailor the modulation and coding scheme (MSC) of the transmissions. In particular, link adaptation is used and based on Channel State Information (CSI), e.g. based on measured instantaneous Signal to Interference and Noise Ratio (SINR) at a wireless device. The wireless device uses the SINR for indicating its recommended modulation and coding scheme for use in subsequent transmissions.

However, channel conditions often change faster than the feedback system in LTE is able to communicate the changes. Thus, sub-optimal modulation and coding may be chosen; i.e. lower modulation and code rate are chosen than the instantaneous channel could support, leading to lower performance than what would actually be possible.

Another feature of LTE is Multi-User Multiple-Input-Multiple-Output (MU-MIMO). The gain and benefits of using MU-MIMO is to a large extent dependent on the ability of pairing the users in a careful way. This can be predicted to some extent, but in order to obtain the full potential of MU-MIMO the correct modulation and coding for a specific pairing of users should be chosen. The co-scheduling of users is therefore highly dependent on the accuracy of the feedback from the wireless devices.

Accurate feedback from wireless devices is thus important for various situations and aspects.

Channel selection is a known way of transmitting feedback information in LTE. It has also been suggested that channel selection is used for transmitting CSI on the Physical Uplink Control Channel (PUCCH).

SUMMARY

An object of the disclosure is to overcome or at least alleviate one or more of the above mentioned problems.

The object is, according to a first aspect, achieved by a method in a wireless device for providing feedback information. The wireless device is adapted for wireless communication in a communication system comprising a network node. The method comprises: receiving, from the network node, a downlink transmission, the downlink transmission comprising a transmission parameter used for the downlink transmission; measuring channel quality of the received downlink transmission; determining, based on the measured channel quality, a transmission parameter that the wireless device is able to support; correlating the transmission parameter used for the downlink transmission with the determined transmission parameter, giving a correlated transmission parameter; and encoding the correlated transmission parameter together with Hybrid Automatic-Repeat-Request feedback information.

The channel quality of the current data transmission as experienced by the wireless device is linked to the choice of modulation and coding, and the interference estimation can be based on the actual downlink transmission. The modulation and coding scheme can thus be connected to the data transmission that it actually relates to and not, as in prior art, to a reference signal.

The interference estimation is based on data symbols instead of pilot symbols, which improves the accuracy of the estimation since the interference on data symbols may differ from the interference on the pilot symbols. The improved interference estimation in turn enables improved choice of modulation and coding scheme and thus improved downlink link adaptation giving higher spectral efficiency and throughput.

In an embodiment, the correlating of the transmission parameter used for the downlink transmission with the determined transmission parameter comprises determining a difference between the determined transmission parameter and the transmission parameter used for the downlink transmission, the correlated transmission parameter comprising the determined difference.

In an embodiment, the correlating of transmission parameter used for the downlink transmission with the determined transmission parameter comprises correlating a determined transmission parameter that is higher than the used transmission parameter with an acknowledgment information and/or correlating a determined transmission parameter that is lower than the used transmission parameter with a negative acknowledgment information.

In an embodiment, the encoding of the correlated transmission parameter together with the Hybrid Automatic-Repeat-Request feedback information comprises using channel selection over predefined resource indices of an uplink channel.

In a variation of the above embodiment, the method comprises receiving, from the network node, a physical downlink control channel assignment, the assignment implicitly indicating resource elements available over which to perform the channel selection.

In another variation, the method comprises receiving, from the network node, signaling indicating a set of resource indices; and performing the channel selection over the indicated set of resource indices.

In a variation of the above embodiment, the receiving of signaling comprises receiving a parameter indicating a number of resource indices for use by the wireless device starting from an pre-assigned uplink channel resource index.

In an embodiment, the indicated resource indices comprise control channel element indices.

In an embodiment, the method comprises adapting the number of predefined resource indices corresponding to a specific combination of encoded correlated channel station information and Hybrid Automatic-Repeat-Request feedback information so as to match a preconfigured error probability for a ratio of negative acknowledgment information to acknowledgment information.

In an embodiment, a first number of the indicated resource indices are for acknowledgment and a second number of the indicated resource indices are for negative acknowledgment, and wherein the first number differs from the second number.

In a variation of the above embodiment, the first and second number of indicated resource indices are determined in dependence on a configurable error probability for a ratio of negative acknowledgment information to acknowledgment information.

In an embodiment, the transmission parameter comprises an indicated modulation and coding scheme and/or a pre-coding matrix index.

In an embodiment, the determining of transmission parameter comprises determining a code rate and/or a modulation scheme that the wireless device is, based on the measured channel quality, able to support.

In an embodiment, the method comprises receiving, from the network node, a configuration message comprising the number of resource indices of an uplink channel over which to perform channel selection and/or interpretation of the resource indices.

In an embodiment, the method comprises receiving, from the network node, a configuration message configuring the wireless device with the number of resource indices of an uplink channel over which to perform channel selection and/or an indication on how to perform the encoding based on the resource indices.

In an embodiment, the method comprises transmitting, to the network node, feedback information comprising the encoded correlated transmission parameter.

In an embodiment, the communication system comprises an LTE system and the downlink channel comprises a physical downlink shared channel and the uplink channel comprises a physical uplink control channel.

The object is, according to a second aspect, achieved by wireless device for providing feedback information. The wireless device is adapted for wireless communication in a communication system comprising a network node. The wireless device is configured to: receive, from the network node, a downlink transmission, the downlink transmission comprising a transmission parameter used for the downlink transmission; measure channel quality of the received downlink transmission; determine, based on the measured channel quality, a transmission parameter, that the wireless device is able to support; correlate the transmission parameter used for the downlink transmission with the determined transmission parameter, giving a correlated transmission parameter; and encode the correlated transmission parameter together with Hybrid Automatic-Repeat-Request feedback information.

In an embodiment, the wireless device is configured to correlate the transmission parameter used for the downlink transmission with the determined transmission parameter by determining a difference between the determined transmission parameter and the transmission parameter used for the downlink transmission, the correlated transmission parameter comprising the determined difference.

In an embodiment, the wireless device is configured to correlate the transmission parameter used for the downlink transmission with the determined transmission parameter by correlating a determined transmission parameter that is higher than the used transmission parameter with an acknowledgment information and/or correlating a determined transmission parameter that is lower than the used transmission parameter with a negative acknowledgment information.

In an embodiment, the wireless device is configured to encode the correlated transmission parameter together with the Hybrid Automatic-Repeat-Request feedback information by using channel selection over predefined resource indices of an uplink channel.

In a variation of the above embodiment, the wireless device is configured to receive, from the network node, a physical downlink control channel assignment, the assignment implicitly indicating resource elements available over which to perform the channel selection.

In another variation, the wireless device is configured to: receive, from the network node, signaling indicating a set of resource indices; and perform the channel selection over the indicated set of resource indices.

The object is, according to a third aspect, achieved by computer program for a wireless device for providing feedback information. The wireless device is adapted for wireless communication in a communication system comprising a network node. The computer program comprises computer program code which, when run on the wireless device, causes the wireless device to perform the steps of: receiving, from the network node, a downlink transmission, the downlink transmission comprising a transmission parameter used for the downlink transmission; measuring channel quality of the received downlink transmission; determining, based on the measured channel quality, a transmission parameter, that the wireless device is able to support; correlating the transmission parameter used for the downlink transmission with the determined transmission parameter, giving a correlated transmission parameter; and encoding the correlated transmission parameter together with Hybrid Automatic-Repeat-Request feedback information.

The object is, according to a fourth aspect, achieved by computer program product comprising a computer program as above and a computer readable means on which the computer program is stored.

The object is, according to a fifth aspect, achieved by a method for link adaptation performed in a network node of a communication system. The method comprises: transmitting, to a wireless device, a downlink transmission, the downlink transmission comprising a transmission parameter used for the downlink transmission; receiving, from the wireless device, a correlated transmission parameter related to the downlink transmission, the correlated transmission parameter comprising a difference between the transmission parameter used in the downlink transmission and a transmission parameter determined by the wireless device, the correlated transmission parameter being encoded together with Hybrid Automatic-Repeat-Request feedback information; and performing link adaptation based on the received correlated transmission parameter.

In an embodiment, the method comprises signaling, prior to the transmitting of a downlink transmission, configuration parameters to the wireless device, the configuration parameters comprising modulation and coding scheme and/or a pre-coding matrix index and/or a block error rate.

In a variation of the above embodiment, the signaling configuration parameters comprises configuring the wireless device to encode the transmission parameter together with the Hybrid Automatic-Repeat-Request feedback information and using channel selection over predefined resource indices of an uplink channel.

In a variation of the above embodiment, the configuration parameters further comprising an indication of a set of resource indices assigned to the wireless device over which to perform the channel selection.

In a variation of the above embodiment, the method comprises adapting the number of predefined resource indices corresponding to a specific combination of encoded transmission parameter and Hybrid Automatic-Repeat-Request feedback information so as to match a preconfigured error probability for a ratio of negative acknowledgment information to acknowledgment information.

The object is, according to a sixth aspect, achieved by a network node of a communication system for link adaptation. The network node is configured to: transmit, to a wireless device, a downlink transmission, the downlink transmission comprising a transmission parameter used for the downlink transmission; receive, from the wireless device, a correlated transmission parameter related to the downlink transmission, the correlated transmission parameter comprising a difference between the transmission parameter used in the downlink transmission and a transmission parameter determined by the wireless device, the correlated transmission parameter being encoded together with Hybrid Automatic-Repeat-Request feedback information; and perform link adaptation based on the received correlated transmission parameter.

The object is, according to a seventh aspect, achieved by computer program for a network node of a communication system. The computer program comprises computer program code which, when run on the network node, causes the network node to perform the steps of: transmitting, to a wireless device, a downlink transmission, the downlink transmission comprising a transmission parameter used for the downlink transmission; receiving, from the wireless device, correlated transmission parameter related to the downlink transmission, the correlated transmission parameter comprising a difference between the transmission parameter used in the downlink transmission and a transmission parameter determined by the wireless device, the correlated transmission parameter being encoded together with Hybrid Automatic-Repeat-Request feedback information; and performing link adaptation based on the received correlated transmission parameter.

The object is, according to an eight aspect, achieved by a computer program product comprising a computer program as above and a computer readable means on which the computer program is stored.

Further features and advantages of the various embodiments will become clear upon reading the following description and the accompanying drawings.

DETAILED DESCRIPTION OF EMBODIMENTS

Figure 1:
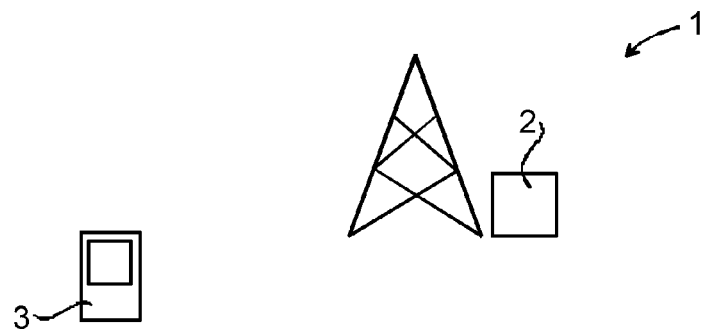
FIG. 1 illustrates schematically an environment in which embodiments of the invention may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, in an aspect the disclosure provides a mechanism giving support for feedback on Physical Downlink Shared CHannel (PDSCH) transmissions. Such feedback is in this description referred to as rich feedback (RHF). The rich feedback is achieved by joint coding with the Hybrid Automatic-Repeat-Request (HARQ) feedback using channel selection on an uplink channel, e.g. a Physical Uplink Control Channel (PUCCH). The feedback may be given as a relative index to a transmission parameter, such as e.g. the modulation and coding scheme (MCS), used in the actual transmission. This in turn enables feedback that is directly associated with a data transmission and thus gives a measurement of the actual channel quality and interference experienced during the data transmission, and an improved MCS selection can thereby be obtained.

In the following, MCS is often used as the transmission parameter in order to exemplify embodiment, but it is noted that the feedback may be another transmission parameter than MCS. Further, LTE system is often used for exemplifying aspects of the disclosure, but it is noted that the described embodiments may be implemented in other communication systems as well.

FIG. 1 illustrates schematically an environment in which embodiments of the invention may be implemented. A communication system 1 comprises a number of network nodes, such as radio base stations 2 which in LTE are commonly denoted eNodeB or eNB. The radio base stations 2 serve one or more cells and the communication system 1 further comprises one or more wireless devices 3 located within and between any such cells. The wireless device 3 may be any device adapted to for wireless communication in the communication system, e.g. conventional user equipment, mobile to mobile (M2M) enabled devices, etc.

In LTE, all data transmissions are controlled by the radio base station 2. Downlink data is transmitted on the PDSCH using incremental redundancy HARQ. In HARQ, acknowledgements (ACKs) and negative acknowledgements (NACKs) are transmitted using binary feedback related to the successful or non-successful reception of a related data unit. In incremental redundancy HARQ, if a NACK is received the radio base station 2 transmits more redundancy information instead of retransmitting the data unit. The probability of successful decoding is thereby increased. On each LTE uplink resource block pair dedicated for physical uplink control channel (PUCCH) up to 36 unique code resources are available. Typically, it is the radio base station 2 that is configured to divide the code resources in time, frequency and code.

In an aspect of the present disclosure, the wireless device 3 is configured to measure channel state information (CSI), e.g. a channel quality indicator (CQI), on a data transmission, instead of or in addition to measuring CQI on CSI reference signals. The wireless device 3 is thereby able to make interference estimates related to the actual data transmission, whereby the interference estimate is improved. The wireless device 3 is further enabled to have wireless device 3 specific beam-forming patterns.

The CSI may e.g. be the above mentioned CQI, the MCS, a pre-coding matrix indicator (PMI), pre-coding type indicator (PTI) and/or rank indicator (RI). The CSI is, in accordance with an aspect, encoded together with the HARQ feedback. This can be done efficiently by viewing also the HARQ feedback as a single bit of CSI information about the channel: an ACK indicates a channel better than what was signaled and a NACK indicates a channel worse than what was signaled. The coding may be achieved by channel selection between a number of physical resources on a PUCCH (for LTE, other channels for other communication systems).

The coding may be specified or signaled by higher layers. Different coding may also be applied dependent on layer 1 signaling, such as in dependence on the MCS that is used.

As mentioned earlier, in an aspect of the present disclosure, ACK/NACK on PUCCH is extended in order to give rich feedback on the PDSCH transmission. The extra CSI may be encoded using channel selection over some pre-defined resource indices on the PUCCH.

Figure 2:
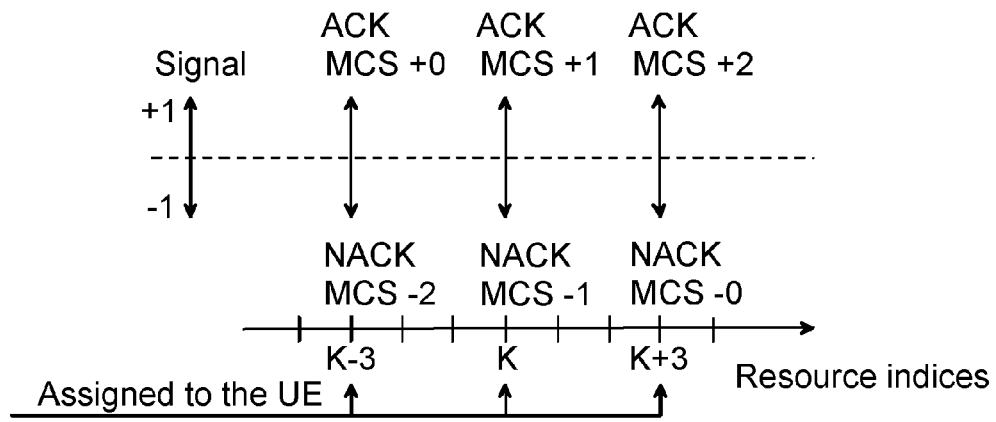
FIGS. 2, 3 and 4 illustrate encoding of feedback jointly with HARQ in accordance with an aspect of the disclosure.

FIG. 2 shows an example of such mapping, wherein encoding of the feedback is performed jointly with HARQ. Resource indices are indicated on the x-axis and particular (exemplifying) resource indices assigned to the wireless device 3 are indicated at the bottom of the figure by arrows pointing at resource indices of the x-axis. In this example, the assigned resource indices are denoted k−3, k and k+3 and the transmission parameter (extra CSI) is exemplified by MCS. Using channel selection over the assigned resource indices, the particular wireless device 3 may signal (using this exemplifying mapping) MCS 0 if sending an ACK on resource index k−3, MCS−2 if sending a NACK on resource index k−3, MCS+1 if sending an ACK on resource index k, MCS−1 if sending a NACK on resource index k, MCS+2 if sending an ACK on resource index k+3, MCS 0 if sending a NACK on resource index k.

Figure 3:
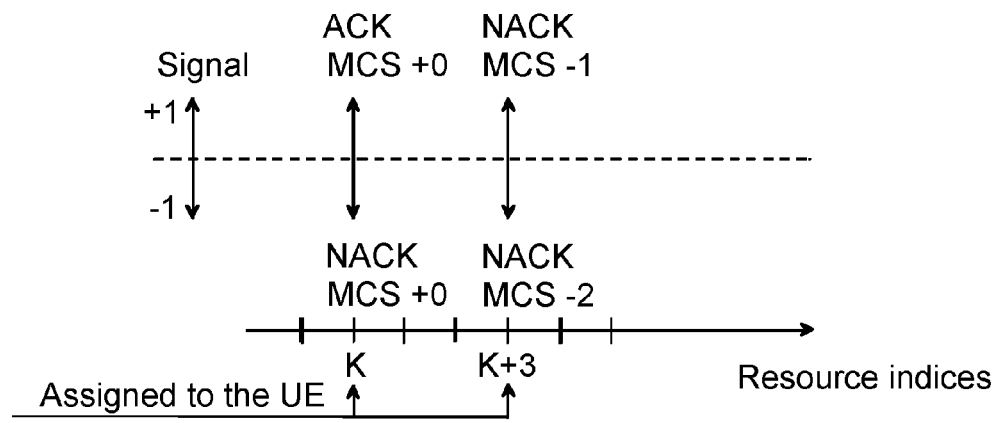

FIG. 3 illustrates another exemplifying mapping following the same principles as in FIG. 2. When the wireless device 3 is signaling using channel selection, the number of hypothesis in the decoding at the base station node 2 is increased. The error probabilities can thus be balanced by choosing how many hypotheses are used in total and how many correspond to a specific outcome. In the following, this is denoted error shaping. For example, if the NACK to ACK error probability is to be reduced, e.g. in order to ensure that the wireless device 3 is robust against missing the signaling in which it is supposed to give the rich ACK/NACK feedback, such error shaping may be used. In FIG. 3 the mapping is chosen in view of this, and thus a single outcome is chosen to correspond to an ACK (namely for resource index k), while three outcomes corresponds to a NACK (namely resource index k, and k+3).

Figure 4:
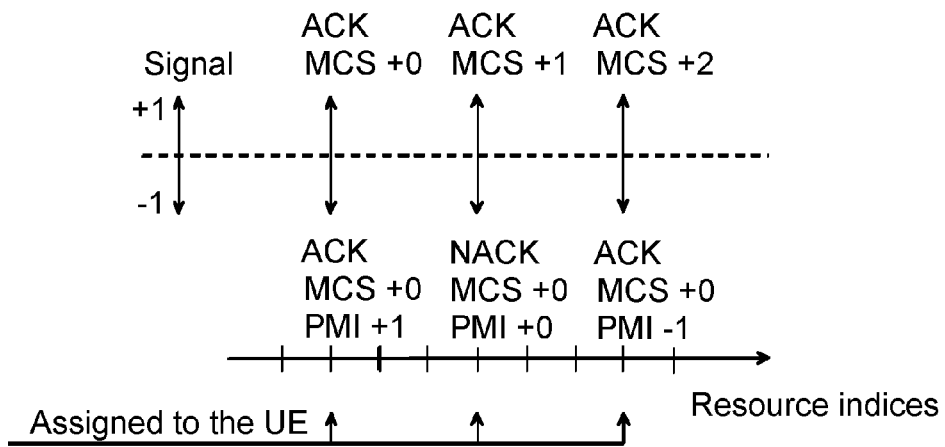

FIG. 4 illustrates another exemplifying mapping following the same principles as in FIG. 2. In LTE, parameters such as MCS and PMI used in a transmission are known both by the base station node 2 and the wireless device 3. The wireless device 3 receives these parameters in a signaling. Therefore, in an aspect of the present disclosure, the complete suitable MCS and/or PMI (as determined by the wireless device 3 based on channel quality) is not transmitted explicitly if the used MCS and/or PMI is close to the determined MCS and/or PMI. For example, if the determined MCS and/or PMI differs by one from the actually used MCS and/or PMI, it is sufficient to signal if the determined MCS and/or PMI is +1 or −1, as indicated in FIG. 4. This feature is denoted compressed transmission parameter feedback, or compressed MCS feedback for this particular example of transmission parameter. It is noted that it is possible to also use the fact that there is a strong correlation between a desire to increase MSC if the transmission was successful (ACK) and the desire to lower the MSC if the transmission was unsuccessful (NACK). Such type of coding is also advantageous when the number of resource indices (channels) used for channel selection is assigned dynamically, since only the number of steps in MCS that can be signaled is limited. Further still, when a choice of MCS is calibrated for a specific wireless device 3, it should be enough to use only two channels for the rich feedback. It is noted that other transmission parameters than MCS/PMI can be signaled in a corresponding way.

FIGS. 2, 3 and 4 thus illustrate different mappings, but it is noted that also other mappings may be chosen. For example, mappings comprising signaling of improved pre-coding, equal and un-equal number of resource indices for ACK and NACK.

The base station node 2 may be configured to explicitly signal to the wireless device 3 which resource indices it should use for the rich feedback. For example, a parameter $\Delta$ could be introduced, informing the wireless device 3 that if it has been assigned a PUCCH resource index i, then it is assigned to use i, i+$\Delta$, . . . , up to i+$\Delta$−1 for channel selection. This may be seen as an index reservation.

In the following, three examples of implementing this are described. In LTE, $\Delta_{shift}^{PUCCH}$ is a parameter that indicates the cyclic shift difference between two adjacent ACK/NACK resources using the same orthogonal cover sequence. In an embodiment, the wireless device 3 may be configured to interpret this parameter $\Delta_{shift}^{PUCCH}$, that is already used in LTE, as the $\Delta$ parameter, as it is known that the physical resources are not used since no PUCCH resource index maps to these physical resources.

A second way of implementing the explicit signaling is to separate the dimensioning of the format 1 region and the format 1a/1b dynamic region for ACK/NACKs by introducing separate parameters for the two regions, $\Delta_{SR}$ and $\Delta_{ACK/NACK}$, respectively. Interference dimensioning may benefit from such implementation. However, if $\Delta_{SR}<\Delta_{ACK/NACK}$ or if $\Delta_{SR}>\Delta_{ACK/NACK}$, then the rich feedback cannot be sent if there are simultaneous positive scheduling requests (SR).

A third way of implementing the explicit signaling is to introduce and use a fixed parameter $\Delta_{RHF}$ indicating the resource indices or the physical resources that are to be used for the rich feedback. An advantage of such implementation is that although it is necessary to schedule these resources for a wireless device 3 in order to avoid collisions in the dynamic ACK/NACK region, there is no need to transmit on these PDCCH resources, thereby avoiding creating unnecessary interference from the PDCCH transmission. Another advantage is that it is easy to signal and handle different $\Delta_{RHF}$ values for different wireless devices (users). For example, it is possible to only use $\Delta_{RHF}>1$ for wireless devices having a large amount of data in their buffers. Further, it is possible to dynamically change a value of $\Delta_{RHF}$ based e.g. on conditions in the communication system 1. For example, if the interference and/or load in a cell is high, $\Delta_{RHF}$ could be set equal to 1 in order to ensure robustness (low decoding error rate on PUCCH) and to maximize PDCCH capacity.

The resource elements available for the rich feedback may be signaled implicitly from the PDCCH assignment. For example, in LTE Rel. 8, the resource index to use for HARQ feedback on the PUCCH for dynamically scheduled PDSCH transmissions are mapped from the index of the first control channel element (CCE) carrying the downlink assignment for the downlink transmission. If the wireless device 3 is assigned more than one CCE it hence knows that all those indices will be free for use, as they are not the first index for any other assignment signaling, and may thus be used for rich feedback. In another embodiment, a number of resources, assigned to the user for use for rich feedback, is configured semi-statically, wherein the configured resources may be e.g. PUCCH indices or offsets to the PUCCH index derived from the PDCCH.

In addition to using PDCCH for rich feedback resource mapping, also other CCEs, addressed to a specific wireless device 3, may be considered as available for use. An example of such other CCEs comprises CCEs carrying uplink grants to the wireless device 3.

Figure 5:
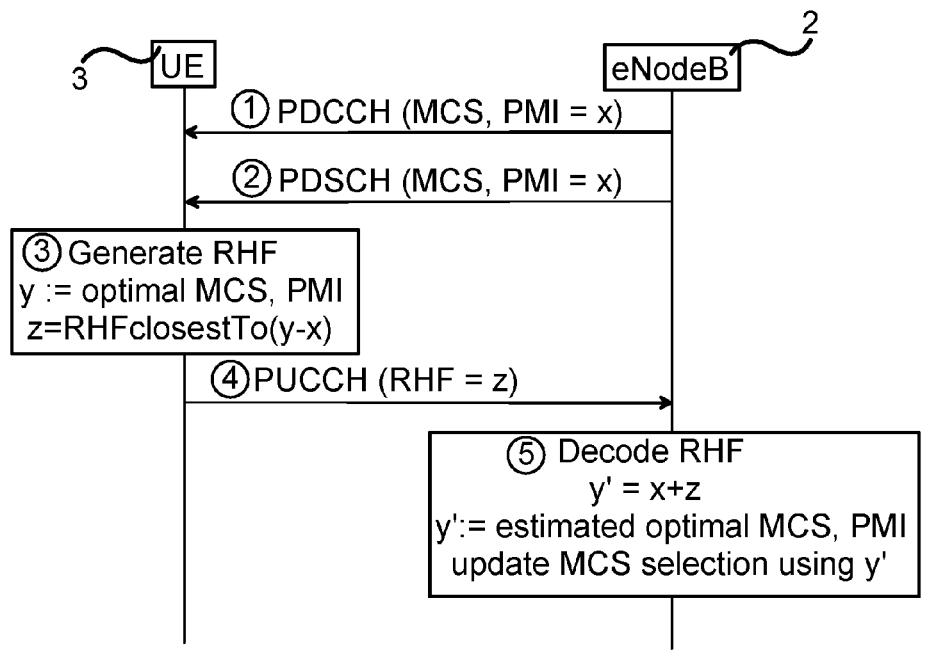
FIG. 5 is a sequence diagram illustrating signaling of a transmission parameter.

FIG. 5 is a sequence diagram illustrating signaling of a transmission parameter. The wireless device 3 receives, from the base station node 2, a PDCCH assignment (arrow 1) comprising information about the data transmission that it is about to receive on the PDSCH (arrow 2). This information comprises MCS, and/or PMI, hence both the base station node 2 and the wireless device 3 are aware of the MCS used (denoted x). The wireless device 3 generates (box 3) the rich feedback by determining an "optimal" MCS, PMI, i.e. a MCS, PMI that it would be able to support based on the measured channel quality on the PDSCH transmission. For example, the highest MCS that can be supported by the wireless device 3 may be determined according to a predefined or signaled block error rate (BLER) target on the PDSCH, i.e. the highest MCS giving a BLER lower than the BLER target.

If the compressed feedback (described earlier) is implemented, the wireless device 3 also determines the compressed MCS, PMI (z), which is the value closest to the difference between the determined MCS, PMI and the used MCS, PMI. Stated differently, given that the rich feedback is configured to support reporting of a fixed number of MCS offsets, pick the closest one that also indicates the correct HARQ-feedback, e.g. the offset that indicates the highest MCS that gives a BLER lower than BLER target or if this is not possible, the one that gives the lowest BLER. For example, if the supported offsets are {NACK−2, NACK−1, ACK 0, ACK+1}, and if ACK, x=17 and y=19 then the wireless device 3 should report ACK+1; if NACK, x=17 and y=14, then the wireless device 3 should report ACK 0.

The wireless device 3 then signals the determined MCS, PMI or the compressed MCS, PMI to the base station node 2 (arrow 4).

The base station node 2 receives the transmission, and decodes (box 5) the rich feedback. For example, in the example illustrated in the figure, compressed feedback is used, so the base station node 2 is able to update the MCS, PMI for use in a next transmission to the wireless device 3 by adding the compressed value z to the previously used MCS, PMI value (i.e. x). That is, the base station node 2 interpret the rich feedback as if the MCS reported by the wireless device 3 is x+offset, e.g. in the first of the above examples, the base station node 2 will interpret the closest MCS to the measured MCS to be 17+1=18.

Figure 6:
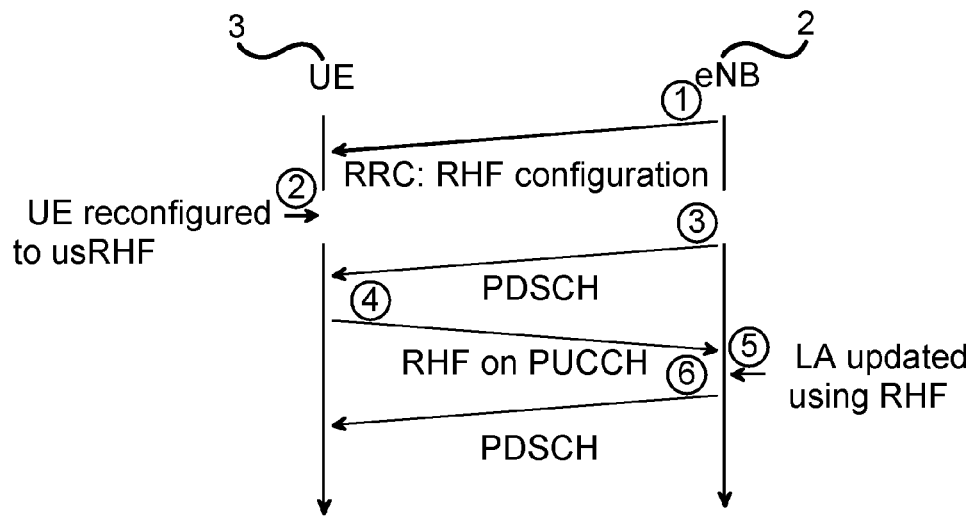
FIG. 6 is a sequence diagram illustrating signaling and using feedback in accordance with embodiments of the disclosure.

FIG. 6 is a sequence diagram illustrating signaling and use of feedback in accordance with embodiments of the disclosure. The wireless device 3 may receive a configuration message (arrow 1) from the base station node 2. The configuration message, e.g. a radio resource control (RRC) message, configures the wireless device 3 and may for example comprise the number of resource indices to be used for the rich feedback and the interpretation of the resource indices. In another embodiment the configuration message comprises an activation flag, by means of which the wireless device 3 is informed about the use of a certain predefined configuration. The wireless device 3 is thus configured (arrow 2).

In another embodiment, the configuration may be signaled directly using the PDCCH formats for PDSCH assignments. This signaling may be configured to current formats or by defining new formats.

In yet another embodiment, medium access control (MAC) elements may be used for signaling configuration or resource indices to be used. The base station node 2 may use MAC elements for performing the signaling on a subframe basis depending on feedback need and available (free) PUCCH indices.

The configuration signaling assigns one or more bits or number of code points such that an integer, such as $\Delta_{RHF} \geq 1$, can be decoded by the wireless device 3. This number $\Delta_{RHF}$ indicates that there are $\Delta_{RHF}$ physical resources allocated to the wireless device 3 for channel selection. These physical resources are selected from the start CCE index i used for the assignment sent to the wireless device 3. The CCE index i is mapped according to e.g. 3GPP LTE standard in case the communication system 1 is an LTE system, to physical resources using a function P defined in the standard. Then the $\Delta$ physical resources to be used by the wireless device 3 is given by P(i), P8i+1), . . . , P(i+$\Delta$−1) or, if, $\Delta_{shift}^{PUCCH}$ is used, $\Delta_{shift}^{PUCCH}$=1P(i), P(i+1), . . . , P(i+$\Delta\Delta_{RHF}$−1); if $\Delta_{shift}^{PUCCH}$=1 by P(i), P(i+1), . . . , P(i+$\Delta_{RHF}$−1); if $\Delta_{shift}^{PUCCH}$=2 by P(i)+P(i)+1, P(i+1)+1 . . . ; if $\Delta_{shift}^{PUCCH}$=3 by P(i), P(i)+1, P(i)+2, P(i+1), P(i+1)+1, . . . . This implies that in order to ensure no existence of collisions on the PUCCH, the CCE indices I, i+1, . . . , i+$\Delta_{RHF}$−1 are excluded for downlink assignments for any other wireless device 3, or if the second alternative is used that i, i+1, . . . , i+ceiling($\Delta_{RHF}/\Delta_{shift}^{PUCCH}$)−1 are excluded.

The wireless device 3 receives a PDSCH transmission (arrow 3), determines the rich feedback, i.e. determines a transmission parameter that it could support, and transmits (arrow 3) the rich feedback to the base station node 2. The base station node 2 is now able to update the link adaptation based on the received rich feedback (reference numeral 5). In the next transmission (arrow 6) to the wireless device 3, the base station node 2 uses the updated transmission parameter(s).

Different mappings for the rich feedback may be signaled from the base station node 2 to a specific wireless device 3 or broadcast to all wireless devices. The mappings may be specific for different transmission modes. For example, given a 1 layer transmission (RI=1), PMI feedback might not be needed and a reporting scheme (mapping) with only MCS feedback is then used.

Figure 7:
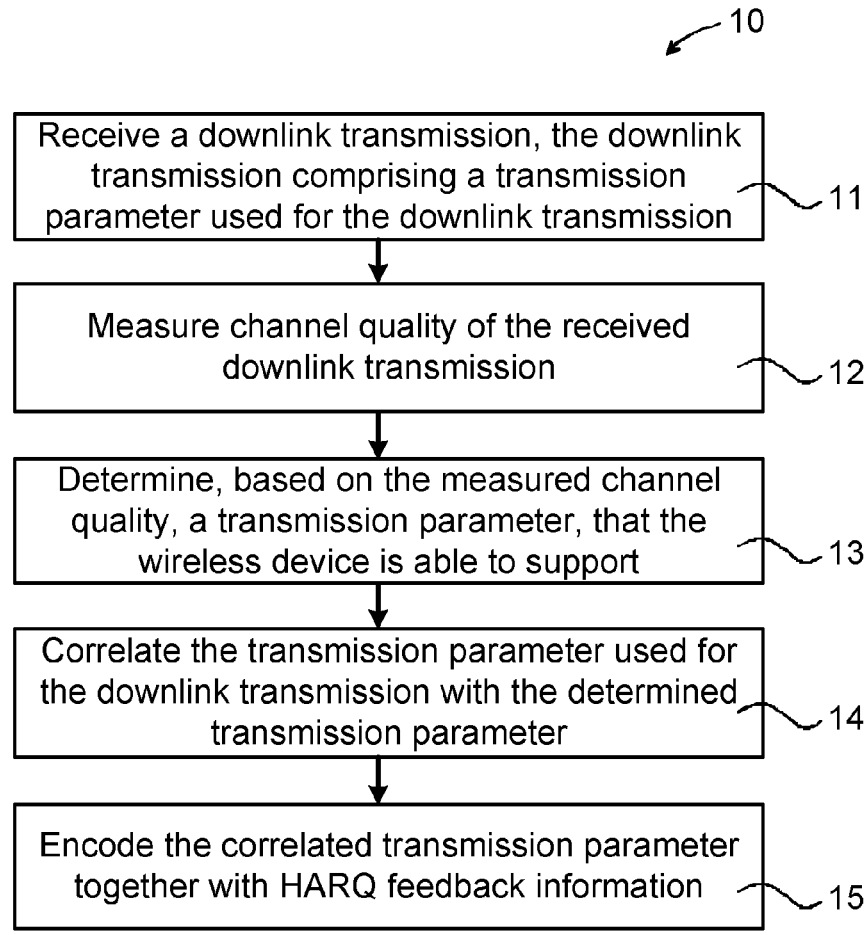
FIG. 7 is a flow chart of a method implemented in a wireless device.

FIG. 7 is a flow chart of a method implemented in a wireless device. The method 10 may be implemented in a wireless device 3 for providing feedback information, wherein the wireless device 3 is adapted for wireless communication in a communication system 1 comprising a base station node 2, in the following denoted network node, such as the communication system 1 described in relation to FIG. 1. The method 10 comprises receiving 11, from the network node 2, a downlink transmission. The downlink transmission comprises a transmission parameter used for the downlink transmission. The transmission parameter may for example comprise an indicated modulation and coding scheme (MCS) and/or a pre-coding matrix index (PMI).

The method 10 further comprises measuring 12 the channel quality of the received downlink transmission. The measured channel quality may for example be Signal to Interference plus Noise Ratio (SINR), but any quality indicator that the wireless device is able to determine for the channel could be used.

The method 10 further comprises determining 13, based on the measured channel quality, a transmission parameter that the wireless device 3 is able to support.

The method 10 further comprises correlating 14 the transmission parameter that is used for the downlink transmission with the determined transmission parameter. This gives a parameter that is denoted correlated transmission parameter.

The method 10 further comprises encoding 15 the correlated transmission parameter together with Hybrid Automatic-Repeat-Request (HARQ) feedback information.

The determination (box 13) of a transmission parameter that the wireless device 3 is able to support may be performed in different ways. The wireless device 3 may for example be configured to determine the transmission parameter based on probability of successfully decoding a downlink transmission having a particular transmission parameter. As a particular example, if the transmission parameter is the code rate and/or modulation scheme, the wireless device may determine a code rate and/or modulation scheme that it would be able to successfully decode without a block error rate (BLER) exceeding 10%.

The correlation (box 14) of the transmission parameter that is used for the downlink transmission with the determined transmission parameter comprises, in an embodiment, determining a difference between the determined transmission parameter and the transmission parameter used for the downlink transmission. The correlated transmission parameter then comprises the determined difference.

In another embodiment, or in a variation of the above embodiment, the correlating 14 of the transmission parameter that is used for the downlink transmission with the determined transmission parameter comprises correlating a determined transmission parameter that is higher than the used transmission parameter with an ACK information and/or correlating a determined transmission parameter that is lower than the used transmission parameter with a NACK information. As a particular example, consider the case wherein the transmission parameter is the MCS. The MCS is determined based on the channel quality for the received downlink transmission, and is an indication on what MCS would have been possible to use based on the instantaneous channel conditions. If the determined MCS is higher than the MCS actually used in the downlink transmission, it is correlated with an ACK. If on the other hand, the determined MCS is lower than the actually used MCS, it is correlated with a NACK.

The above can also be stated differently, in view of channel selection. When a received transmission is successfully decoded, an ACK is to be sent. When a difference between the determined MCS and the actually used MCS is to be determined, a positive value may be expected since the decoding was successful, and the code constellation points to choose among should mainly have positive values. The reverse is true for the case of a NACK. Thus: if the received transmission is a positive acknowledgement, i.e. an ACK is to be sent, then the difference between the determined MCS and the actually used MCS may be reported by selecting from a set of only (or mainly) positive values (and zero) among the code constellation points of the channel selection; and if the received transmission is a negative acknowledgement, i.e. a NACK is to be sent, then the difference between the determined MCS and the actually used MCS is selected from a set of only (or mainly) negative values (and zero) among the code constellation points of the channel selection.

The encoding (box 15) of the correlated transmission parameter together with the HARQ information may comprise using channel selection over predefined resource indices of an uplink channel. By this joint coding of a relative index to the transmission parameter used in the actual transmission with acknowledgment/negative acknowledgment, feedback that is directly associated to the data transmission is enabled and gives a measurement of the actual channel quality and interference experienced during the data transmission. The HARQ feedback information is thus used as additional channel state information.

In an embodiment, based on the above-described embodiment of using channel selection, the method 10 may further comprise receiving, from the network node 2, a physical downlink control channel assignment, wherein the assignment implicitly indicates available resource elements over which to perform the channel selection.

In another embodiment, the method 10 comprises receiving, from the network node 2, signaling indicating a set of resource indices; and performing the channel selection over the indicated set of resource indices.

In a variation of the above embodiment, the receiving of signaling comprises receiving a parameter $\Delta$ indicating a number of resource indices for use by the wireless device 3 starting from an pre-assigned uplink channel resource index i.

The indicated resource indices may e.g. comprise control channel element indices, as described earlier.

The method 10 may comprise adapting the number of predefined resource indices that correspond to a specific combination of encoded correlated channel station information and HARQ feedback information so as to match a preconfigured error probability for a ratio of negative acknowledgment information to acknowledgment information (refer to and compare also with FIG. 3 and related description).

In an embodiment, a first number of the indicated resource indices are for acknowledgments and a second number of the indicated resource indices are for negative acknowledgments, and wherein the first number differs from the second number.

In a variation of the above embodiment, the first and second number of indicated resource indices are determined in dependence on a configurable error probability for a ratio of negative acknowledgment information to acknowledgment information (again, refer to and compare also with FIG. 3 and related description).

As mentioned earlier, the transmission parameter may for example comprise an indicated MCS and/or a PMI. Thus, the determining 13 of transmission parameter may comprise determining a code rate and/or a modulation scheme that the wireless device 3 is able to support, based on the measured channel quality.

In an embodiment, the method 10 comprises receiving, from the network node 2, a configuration message comprising the number of resource indices of an uplink channel over which to perform channel selection and/or interpretation of the resource indices. This feature has been described and exemplified thoroughly earlier.

In an embodiment, the method 10 comprises receiving, from the network node 2, a configuration message configuring the wireless device 3 with the number of resource indices of an uplink channel over which to perform channel selection and/or an indication on how to perform the encoding based on the resource indices. This feature has also been described and exemplified thoroughly earlier.

In an embodiment, the method 10 comprises transmitting, to the network node 2, feedback information comprising the encoded correlated transmission parameter. The network node 2 may then use this transmission parameter to perform improved link adaptation.

In a particular embodiment, the communication system 1 comprises an LTE system and the downlink channel comprises a physical downlink shared channel and the uplink channel comprises a physical uplink control channel. It is however noted that aspects of the present disclosure is applicable to other communication systems as well.

The features of the various embodiments may be combined in other ways than the explicitly mentioned.

Figure 8:
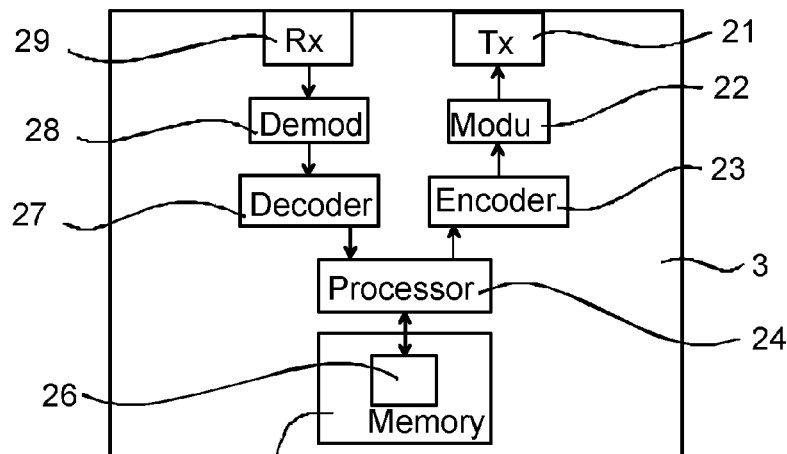
FIG. 8 illustrates an exemplifying wireless device comprising means for implementing embodiments of the methods.

FIG. 8 illustrates an exemplifying wireless device 3 comprising means, e.g. circuitry, for implementing embodiments of the methods as described. In particular, the wireless device 3 may comprise a processor or processing circuitry 24 configured to perform the steps as described in the various embodiments.

The wireless device 3 may comprise receiving circuitry 29 for receiving, from the network node 2, the downlink transmission comprising the transmission parameter used for the downlink transmission.

The processor 24 may be configured to measure the channel quality of the received downlink transmission, and to determine, based on the measured channel quality, a transmission parameter that the wireless device 3 is able to support.

The processor 24 may further be configured to correlate the transmission parameter used for the downlink transmission with the determined transmission parameter.

The wireless device 3 may also comprise an encoder 23 receiving input from the processor 24 and outputting encoded data to a modulator 22, which in turn outputs a modulated data stream to be sent by transmitting circuitry 21 and antennas (not illustrated) to the base station node 2. The modulator 22 is connected to the processor 24, and may be configured to encode the correlated transmission parameter together with HARQ feedback information.

It is realized that the wireless device 3 comprises further, conventional circuitry, e.g. a demodulator 28, decoder 27 and modulator 22. It is thus noted that the wireless device 3 typically performs further operations that could be implemented by further functional blocks, than those illustrated in FIG. 8. Examples of such further functional blocks comprise transmitter and receiver front end circuitry, signal generation module, antenna selector module etc.

It is noted that the functions described in relation to e.g. FIG. 7 may be performed by any other circuitry, hardware or software or combinations thereof, than the above described modules.

The invention also encompasses a computer program 26 for the wireless device 3 for providing feedback information. The computer program 26 comprises computer program code which, when run on the wireless device 3, or particularly run on the processor 24 thereof, causes wireless device 3 to perform the steps of: receiving, from the network node 2, a downlink transmission, the downlink transmission comprising a transmission parameter used for the downlink transmission; measuring channel quality of the received downlink transmission; determining, based on the measured channel quality, a transmission parameter, that the wireless device 3 is able to support; correlating the transmission parameter used for the downlink transmission with the determined transmission parameter, giving a correlated transmission parameter; and encoding the correlated transmission parameter together with HARQ feedback information.

The processor 24 may for example comprise general purpose microprocessors, central processing unit (CPU), digital signal processor (DSP), instruction set processors and/or related chips sets and/or special purpose microprocessors, such as ASICs (application specific integrated circuits). The processor 24 may also comprise board memory for caching purposes. The processor 24 is capable of executing software instructions stored in a computer program product 25 e.g. in the form of a memory.

The invention further encompasses such a computer program product 25 comprising a computer program 26 as described above and a computer readable means on which the computer program 26 is stored. For example, the computer program product 25 may be a flash memory, a RAM (Random-access memory), ROM (Read-Only memory) or an EEPROM (Electrically Erasable Programmable ROM), or any combination of read and write memory (RAM) and read only memory (ROM), an optical disc, such as a CD (compact disc) or a DVD (digital versatile disc) or a Blu-Ray disc. The memory may also comprise persistent storage, which, for example, can be any single one or combination of magnetic memory, optical memory, or solid state memory.

Figure 9:
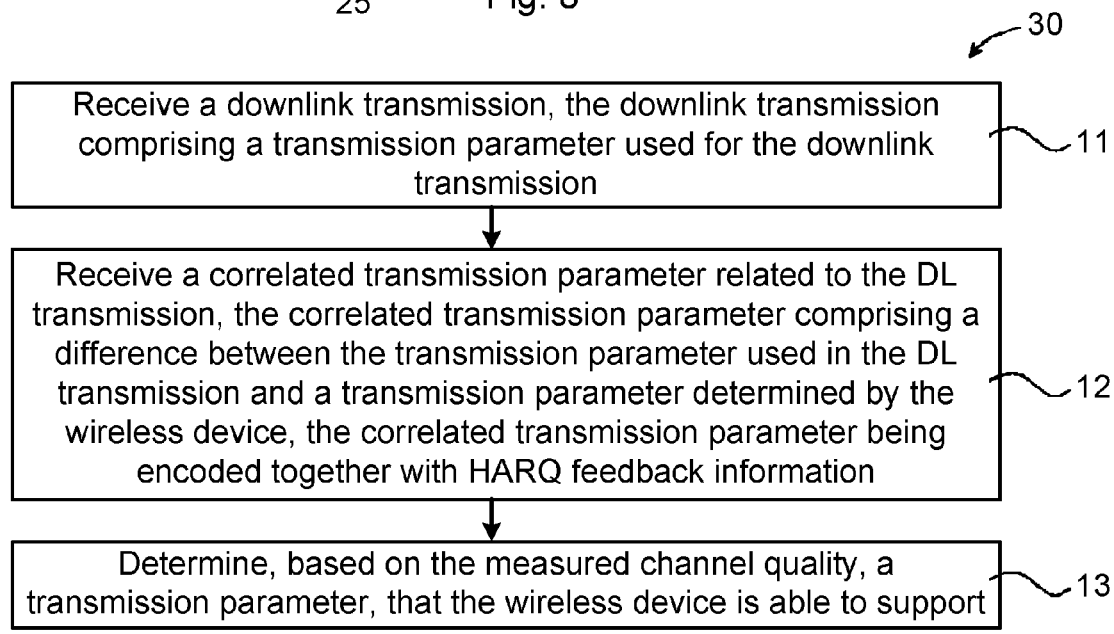
FIG. 9 is a flow chart of a method implemented in a base station.

FIG. 9 is a flow chart of a method 30 for link adaptation and implemented in a base station node 2 (network node 2) of the communication system 1, as described earlier. The method 30 comprises transmitting (box 31), to the wireless device 3, a downlink transmission, the downlink transmission comprising a transmission parameter used for the downlink transmission.

The method 30 further comprises receiving (box 32), from the wireless device 3, a correlated transmission parameter related to the downlink transmission. The correlated transmission parameter comprises a difference between the transmission parameter used in the downlink transmission and a transmission parameter determined by the wireless device 3. Further, the correlated transmission parameter is encoded together with HARQ information, as described earlier.

The method 30 further comprises performing link adaptation (box 33) based on the received correlated transmission parameter.

Figure 10:
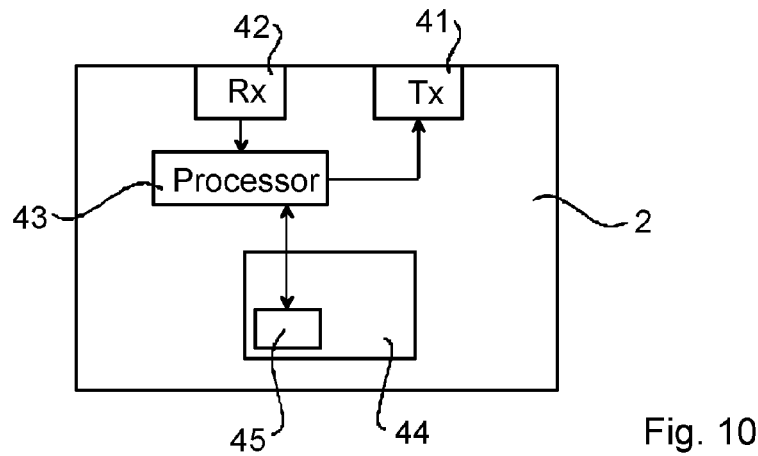
FIG. 10 illustrates an exemplifying base station comprising means for implementing embodiments of the methods.

FIG. 10 illustrates an exemplifying base station node 2 comprising means, e.g. circuitry, for implementing embodiments of the methods. 31. The network node 2, and in particular a processor or processing circuitry 43 thereof, may be configured to transmit, to a wireless device 3, a downlink transmission, the downlink transmission comprising a transmission parameter used for the downlink transmission; receive, from the wireless device 3, a correlated transmission parameter related to the downlink transmission, the correlated transmission parameter comprising a difference between the transmission parameter used in the downlink transmission and a transmission parameter determined by the wireless device 3, the correlated transmission parameter being encoded together with HARQ feedback information; and perform link adaptation 33 based on the received correlated transmission parameter.

It is noted that the base station node 3 typically performs further operations that could be implemented by further functional blocks, than those illustrated in FIG. 10.

The invention also encompasses a computer program 45 for the base station node 2 for providing feedback information. The computer program 45 comprises computer program code which, when run on the base station node 2, or particularly run on the processor 43 thereof, causes the base station node 2 to perform the steps of: transmitting, to a wireless device 3, a downlink transmission, the downlink transmission comprising a transmission parameter used for the downlink transmission; receiving, from the wireless device 3, correlated transmission parameter related to the downlink transmission, the correlated transmission parameter comprising a difference between the transmission parameter used in the downlink transmission and a transmission parameter determined by the wireless device 3, the correlated transmission parameter being encoded together with HARQ feedback information; and performing link adaptation based on the received correlated transmission parameter.

The processor 43 may for example comprise general purpose microprocessors, central processing unit (CPU), digital signal processor (DSP), instruction set processors and/or related chips sets and/or special purpose microprocessors, such as ASICs (application specific integrated circuits). The processor 43 may also comprise board memory for caching purposes. The processor 43 is capable of executing software instructions stored in a computer program product 44 e.g. in the form of a memory.

The invention further encompasses such a computer program product 44 comprising a computer program 45 as described above and a computer readable means on which the computer program 45 is stored. For example, the computer program product 44 may be a flash memory, a RAM (Random-access memory), ROM (Read-Only memory) or an EEPROM (Electrically Erasable Programmable ROM), or any combination of read and write memory (RAM) and read only memory (ROM), an optical disc, such as a CD (compact disc) or a DVD (digital versatile disc) or a Blu-Ray disc. The memory may also comprise persistent storage, which, for example, can be any single one or combination of magnetic memory, optical memory, or solid state memory

The invention claimed is:

1. A method in a wireless device for providing feedback information, the wireless device being adapted for wireless communication in a communication system comprising a network node, wherein the wireless device corresponds to a user equipment and the network node corresponds to a radio base station, the method comprising:
   receiving, from the network node, a downlink transmission, the downlink transmission comprising a transmission parameter used for the downlink transmission,
   measuring channel quality of the received downlink transmission,
   determining, based on the measured channel quality, a transmission parameter, that the wireless device is able to support,
   correlating the transmission parameter used for the downlink transmission with the determined transmission parameter, giving a correlated transmission parameter, wherein the correlated transmission parameter indicates whether or not the determined transmission parameter is higher than transmission parameter used for the downlink transmission,
   encoding the correlated transmission parameter together with Hybrid Automatic-Repeat-Request feedback information using channel selection over predefined resource indices of an uplink channel; and
   receiving, from the network node, a physical downlink control channel assignment, the assignment indicating resource elements available over which to perform the channel selection.

2. The method as claimed in claim 1, wherein the correlating of the transmission parameter used for the downlink transmission with the determined transmission parameter comprises determining a difference between the determined transmission parameter and the transmission parameter used for the downlink transmission, the correlated transmission parameter comprising the determined difference.

3. The method as claimed in claim 1, wherein the correlating of the transmission parameter used for the downlink transmission with the determined transmission parameter comprises correlating a determined transmission parameter that is higher than the transmission parameter used for the downlink transmission with an acknowledgment information or correlating a determined transmission parameter that is lower than the used transmission parameter with a negative acknowledgment information.

4. The method as claimed in claim 1, comprising:
   receiving, from the network node, signaling indicating a set of resource indices,
   performing the channel selection over the indicated set of resource indices.

5. The method as claimed in claim 1, comprising adapting a number of the predefined resource indices corresponding to a specific combination of encoded correlated channel station information and Hybrid Automatic-Repeat-Request feedback information so as to match a preconfigured error probability for a ratio of negative acknowledgment information to acknowledgment information.

6. The method as claimed in claim 1, wherein a first number of the indicated resource indices are for acknowledgment and a second number of the indicated resource indices are for negative acknowledgment, and wherein the first number differs from the second number.

7. The method as claimed in claim 6, wherein the first and second number of indicated resource indices are determined in dependence on a configurable error probability for a ratio of negative acknowledgment information to acknowledgment information.

8. The method as claimed in claim 1, wherein the transmission parameter comprises an indicated modulation and coding scheme or a pre-coding matrix index.

9. The method as claimed in claim 1, wherein the determining of transmission parameter comprises determining a code rate or a modulation scheme that the wireless device is, based on the measured channel quality, able to support.

10. The method of claim 1, wherein the determined transmission parameter used for the downlink transmission and the correlated transmission parameter is a rank indicator.

11. The method of claim 1, wherein the determined transmission parameter used for the downlink transmission and the correlated transmission parameter is a pre-coding matrix index.

12. A non-transitory computer readable storage medium having stored thereon, a set of computer-executable instructions executed by a wireless device for providing feedback information, the wireless device being adapted for wireless communication in a communication system comprising a network node, wherein the wireless device corresponds to a user equipment and the network node corresponds to a radio base station, the set of computer-executable instructions which, when run on the wireless device perform steps comprising:
   receiving, from the network node, a downlink transmission, the downlink transmission comprising a transmission parameter used for the downlink transmission,
   measuring channel quality of the received downlink transmission, determining, based on the measured channel quality, a transmission parameter, that the wireless device is able to support, correlating the transmission parameter used for the downlink transmission with the determined transmission parameter, giving a correlated transmission parameter, wherein the correlated transmission parameter indicates whether or not the determined transmission parameter is higher than transmission parameter used for the downlink transmission, encoding the correlated transmission parameter together with Hybrid Automatic-Repeat-Request feedback information using channel selection over predefined resource indices of an uplink channel; and receiving from the network node, a physical downlink control channel assignment, the assignment indicating resource elements available over which to perform the channel selection.

13. The non-transitory computer readable storage medium as claimed in claim 12, further comprising correlating the transmission parameter used for the downlink transmission with the determined transmission parameter by determining a difference between the determined transmission parameter and the transmission parameter used for the downlink transmission, the correlated transmission parameter comprising the determined difference.

14. The non-transitory computer readable storage medium as claimed in claim 12, further comprising correlating the transmission parameter used for the downlink transmission with the determined transmission parameter by correlating a determined transmission parameter that is higher than the transmission parameter used for the downlink transmission with an acknowledgment information or correlating a determined transmission parameter that is lower than the used transmission parameter with a negative acknowledgment information.

15. The non-transitory computer readable storage medium as claimed in claim 12, further comprising:
receive, from the network node, signaling indicating a set of resource indices, and
perform the channel selection over the indicated set of resource indices.

16. A method for link adaptation performed in a network node of a communication system, wherein the network node corresponds to a radio base station, the method comprising:
transmitting, to a wireless device, a downlink transmission, the downlink transmission comprising a transmission parameter used for the downlink transmission, wherein the wireless device corresponds to a user equipment,
receiving, from the wireless device, a correlated transmission parameter related to the downlink transmission, the correlated transmission parameter comprising a difference between the transmission parameter used in the downlink transmission and a transmission parameter determined by the wireless device based on channel quality of the downlink transmission,
wherein the correlated transmission parameter indicates whether or not the determined transmission parameter is higher than the transmission parameter used for the downlink transmission, and wherein the correlated transmission parameter being encoded together with Hybrid Automatic-Repeat-Request feedback information using channel selection over predefined resource indices of an uplink channel,
transmitting, to the wireless device, a physical downlink control channel assignment, the assignment indicating resource elements available over which to perform the channel selection, and
performing link adaptation based on the received correlated transmission parameter.

17. The method as claimed in claim 16, comprising signaling, prior to the transmitting of a downlink transmission, configuration parameters to the wireless device, the configuration parameters comprising modulation and coding scheme or a pre-coding matrix index, or a block error rate.

18. The method as claimed in claim 17, wherein the signaling configuration parameters comprises configuring the wireless device to encode the transmission parameter together with the Hybrid Automatic-Repeat-Request feedback information.

19. The method as claimed in claim 18, the configuration parameters further comprising an indication of a set of resource indices assigned to the wireless device over which to perform the channel selection.

20. The method as claimed in claim 19, comprising adapting a number of the predefined resource indices corresponding to a specific combination of encoded transmission parameter and Hybrid Automatic-Repeat-Request feedback information so as to match a preconfigured error probability for a ratio of negative acknowledgment information to acknowledgment information.

21. A network node of a communication system for link adaptation, wherein the network node corresponds to a radio base station, the network node being configured to:
transmit, to a wireless device, a downlink transmission, the downlink transmission comprising a transmission parameter used for the downlink transmission, wherein the wireless device corresponds to a user equipment,
receive, from the wireless device, a correlated transmission parameter related to the downlink transmission, the correlated transmission parameter comprising a difference between the transmission parameter used in the downlink transmission and a transmission parameter determined by the wireless device based on channel quality of the downlink transmission,
wherein the correlated transmission parameter indicates whether or not the determined transmission parameter is higher than the transmission parameter used for the downlink transmission, and wherein the correlated transmission parameter being encoded together with Hybrid Automatic-Repeat-Request feedback information using channel selection over predefined resource indices of an uplink channel,
transmit, to the wireless device, a physical downlink control channel assignment, the assignment indicating resource elements available over which to perform the channel selection, and
perform link adaptation based on the received correlated transmission parameter.

* * * * *